(12) United States Patent
Uchida (10) Patent No.: US 12,231,765 B2
(45) Date of Patent: Feb. 18, 2025

(54) IMAGING SUPPORT APPARATUS, IMAGING SUPPORT METHOD AND NON-TRANSITORY COMPUTER-READABLE MEDIUM FOR DETERMINING A SATELLITE IMAGE CAPTURE TIMING BASED ON SIMILARITY

(71) Applicant: Yokogawa Electric Corporation, Tokyo (JP)

(72) Inventor: Yukihiro Uchida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 15 days.

(21) Appl. No.: 18/314,130

(22) Filed: May 8, 2023

(65) Prior Publication Data

US 2023/0379574 A1 Nov. 23, 2023

(30) Foreign Application Priority Data

May 19, 2022 (JP) .................................. 2022-082657

(51) Int. Cl.
*H04N 23/60* (2023.01)
*G06V 10/25* (2022.01)
(Continued)

(52) U.S. Cl.
CPC ............. *H04N 23/64* (2023.01); *G06V 10/25* (2022.01); *G06V 10/761* (2022.01); *G06V 20/13* (2022.01); *G06V 20/188* (2022.01)

(58) Field of Classification Search
CPC ........ H04N 23/64; H04N 23/11; G06V 10/25; G06V 10/761; G06V 20/13; G06V 10/188; G06F 18/22
See application file for complete search history.

(56) References Cited

U.S. PATENT DOCUMENTS

2012/0188372 A1 7/2012 Ozkul
2015/0009326 A1 1/2015 Saito
(Continued)

FOREIGN PATENT DOCUMENTS

JP 2005310052 A 11/2005
JP 2013518246 A 5/2013
(Continued)

OTHER PUBLICATIONS

Extended European Search Report for counterpart European Application No. 23172105.1, issued by the European Patent Office on Sep. 8, 2023.
(Continued)

*Primary Examiner* — Nicholas G Giles (57) ABSTRACT

Provided is an imaging support apparatus including: a first information acquiring unit configured to acquire first information indicating a first timing at which a satellite image of a target area is captured; a prediction result acquiring unit configured to acquire a prediction result of a time-series prediction of an imaging environment in the target area; a calculating unit configured to calculate on a time-series basis, based on the prediction result, a degree of similarity of an imaging environment between the first timing and each timing other than the first timing; a determining unit configured to determine a second timing on which a satellite image of the target area is to be captured based on the degree of similarity; and a second information output unit configured to output second information indicating the second timing.

20 Claims, 7 Drawing Sheets

(51) Int. Cl.
*G06V 10/74* (2022.01)
*G06V 20/10* (2022.01)
*G06V 20/13* (2022.01)

(56) References Cited

U.S. PATENT DOCUMENTS

2020/0160029 A1    5/2020  Amselem
2024/0288602 A1*   8/2024  Shi ......................... G01V 3/10

FOREIGN PATENT DOCUMENTS

JP    2015028759 A    2/2015
JP    2020173604 A    10/2020
JP    2021006017 A    1/2021

OTHER PUBLICATIONS

Office Action issued for counterpart Japanese Application No. 2022-082657, transmitted from the Japanese Patent Office on Jan. 7, 2025 (drafted on Dec. 23, 2024).

* cited by examiner

IMAGING SUPPORT APPARATUS, IMAGING SUPPORT METHOD AND NON-TRANSITORY COMPUTER-READABLE MEDIUM FOR DETERMINING A SATELLITE IMAGE CAPTURE TIMING BASED ON SIMILARITY

The contents of the following Japanese patent application(s) are incorporated herein by reference:

NO. 2022-082657 filed in JP on May 19, 2022

BACKGROUND

1. Technical Field

The present invention relates to an imaging support apparatus, an imaging support method and a non-transitory computer-readable medium.

2. Related Art

In Patent document 1, there is described that "As a satellite image which is cloud-covered by a certain ratio or more is not usable, the points that can be collected in the area are adjusted to be approximately 0".

PRIOR ART DOCUMENT

Patent Document

Patent document 1: Japanese Patent Application Publication No. 2020-173604
Patent document 2: Japanese Patent Application Publication No. 2015-028759
Patent document 3: Japanese Patent Application Publication No. 2021-006017

SUMMARY

In the first aspect of the present invention, an imaging support apparatus is provided. The imaging support apparatus includes: a first information acquiring unit configured to acquire first information indicating a first timing at which a satellite image of a target area is captured; a prediction result acquiring unit configured to acquire a prediction result of a time-series prediction of an imaging environment in the target area; a calculating unit configured to calculate on a time-series basis, based on the prediction result, a degree of similarity of an imaging environment between the first timing and each timing other than the first timing; a determining unit configured to determine a second timing on which a satellite image of the target area is to be captured based on the degree of similarity; and a second information output unit configured to output second information indicating the second timing.

In the imaging support apparatus, the imaging environment may include at least an index indicating the soil moisture content in the target area.

Any one of the imaging support apparatuses may further include a weather data acquiring unit configured to acquire weather data; and a prediction unit configured to predict the index based on the weather data.

In any one of the imaging support apparatuses, the prediction unit may predict the index by using a tank model.

In any one of the imaging support apparatuses, the determining unit may determine the second timing from among potential timings at which a difference in the index satisfies a predetermined criterion between the first timing and each timing other than the first timing.

In any one of the imaging support apparatuses, the second information output unit may output an imaging request command configured to request for capturing the target area at the second timing.

Any one of the imaging support apparatuses may further include a first image acquiring unit configured to acquire first satellite image data obtained by capturing the target area at the first timing; and a second image acquiring unit configured to acquire second satellite image data obtained by capturing the target area at the second timing.

Any one of the imaging support apparatuses may further include an image analysis unit configured to analyze the first satellite image data and the second satellite image data.

In any one of the imaging support apparatuses, the image analysis unit may detect a change in vegetation in the target area based on a difference between the first satellite image data and the second satellite image data.

Any one of the imaging support apparatuses may further include an analysis result output unit configured to generate an alert when the change in vegetation exceeds a predetermined criterion.

In a second aspect of the present invention, an imaging support method is provided. The imaging support method is performed by a computer and includes the following steps executed by the computer: acquiring first information indicating a first timing at which a satellite image of a target area is captured; acquiring a prediction result of a time-series prediction of an imaging environment in the target area; calculating on a time-series basis, based on the prediction result, a degree of similarity of an imaging environment between the first timing and each timing other than the first timing; determining a second timing on which a satellite image of the target area is to be captured based on the degree of similarity; and outputting second information indicating the second timing.

In a third aspect of the present invention, a non-transitory computer-readable medium having an imaging support program recorded thereon is provided. The imaging support program is performed by a computer, and causes the computer to function as: a first information acquiring unit configured to acquire first information indicating a first timing at which a satellite image of a target area is captured; a prediction result acquiring unit configured to acquire a prediction result of a time-series prediction of an imaging environment in the target area; a calculating unit configured to calculate on a time-series basis, based on the prediction result, a degree of similarity of an imaging environment between the first timing and each timing other than the first timing; a determining unit configured to determine a second timing on which a satellite image of the target area is to be captured based on the degree of similarity; and a second information output unit configured to output second information indicating the second timing.

The summary clause does not necessarily describe all necessary features of the embodiments of the present invention. In addition, the present invention may also be a sub-combination of the features described above.

DESCRIPTION OF EXEMPLARY EMBODIMENTS

Hereinafter, an embodiment of the present invention will be described, but the embodiment does not limit the invention according to the claims. In addition, not all combinations of features described in the embodiment are essential to the solution of the invention.

Figure 1:
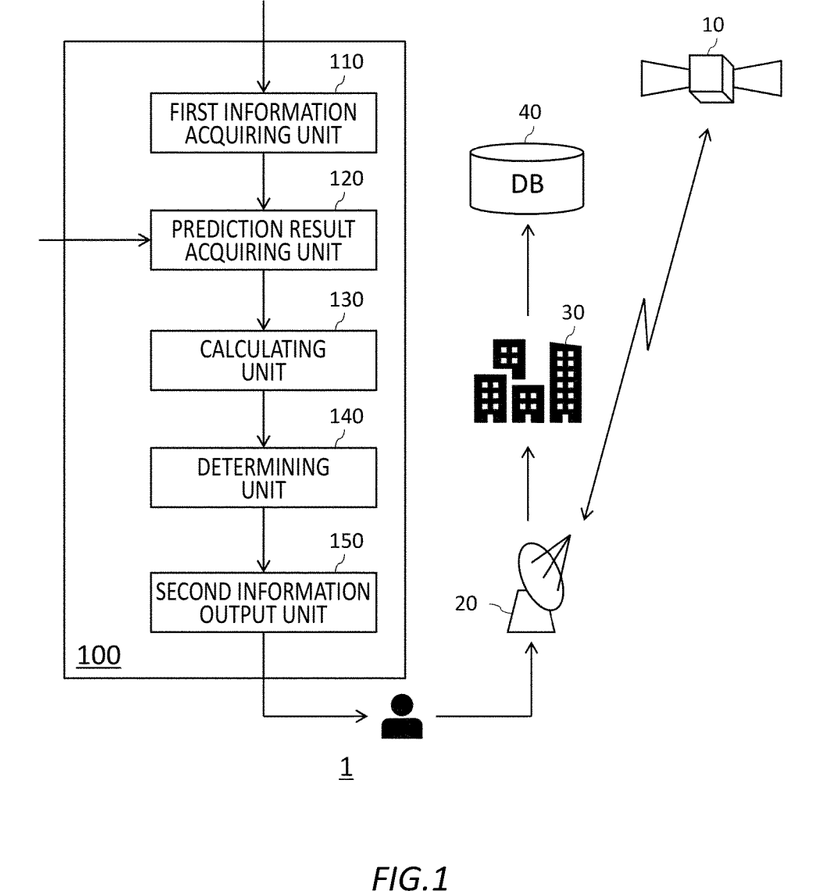
FIG. 1 shows an example of a block diagram of an imaging system 1 that may include an imaging support apparatus 100 according to the present embodiment.

FIG. 1 shows an example of a block diagram of a remote sensing system 1 that may include an imaging support apparatus 100 according to the present embodiment. Note that, these blocks are functional blocks that are each functionally divided, and may not be necessarily required to be matched with actual apparatus configurations. That is, in the present drawing, an apparatus indicated by one block may not be necessarily required to be configured by one apparatus. In addition, in the present drawing, apparatuses indicated by separate blocks may not be necessarily required to be configured by separate apparatuses. The same applies to subsequent block diagrams.

During the remote sensing, attempts are made to capture changes in a land surface by analyzing a plurality of satellite images captured at different time points. However, upon capturing the satellite images, the imaging environment changes from moment to moment. Therefore, a difference in the imaging environment between the plurality of satellite images may affect the analysis results. The imaging support apparatus 100 according to the present embodiment supports capturing the satellite images so as to reduce such influences, for example. The remote sensing system 1 includes a satellite 10, a ground station 20, a processing station 30, a database 40 and an imaging support apparatus 100.

The satellite 10 is an artificial satellite configured to observe the earth by using radio waves, infrared rays and visible light, and is also referred to as an earth observation satellite or a remote sensing satellite. The satellite 10 can communicate with the ground station 20, for example, the satellite 10 receives a command, from the ground station 20, for commanding to capture a satellite image and transmits, to the ground station 20, data of the captured satellite image in response to the command.

The ground station 20 is a facility which is provided on the ground to communicate with the satellite 10, and is also referred to as a satellite communication facility. The ground station 20 can communicate with the satellite 10, for example, the ground station 20 transmits, to the satellite 10, when there is a request for capturing the satellite images, a command for commanding to capture the satellite images, and receives, from the satellite 10, data of the captured satellite images in response to the command.

Note that, during the communication between the satellite 10 and the ground station 20, various modulation and demodulation or power amplification may be performed. In addition, the satellite 10 and the ground station 20 may directly communicate without going through another apparatus, or may indirectly communicate through another apparatus which is not illustrated (for example, communication satellite). The ground station 20 supplies the received satellite image data to the processing station 30.

The processing station 30 applies various processes on the satellite image data. For example, the processing station 30 may crop the satellite image data supplied from the ground station 20 by a predetermined magnitude. Also, the processing station 30 may perform correction, on the satellite image data, the sensitivity of a sensor mounted on the satellite 10, a position or angle of the Sun, and a distortion of radiation amount caused by atmosphere condition and the like (Radiometric correction). Also, the processing station 30 may perform correction, on the satellite image data, an influence caused by the rotation or curvature of the Earth, and a position change and the like of the satellite 10 (geometric correction). The processing station 30 stores the corrected satellite image data in the database 40 together with metadata such as the capturing date and time or information at the time of the correction.

The database 40 has the satellite image data saved therein. For example, in the database 40, the satellite image data supplied by the processing station 30 and the metadata may be saved in association with each other. A user can acquire or purchase such data saved in the database 40 through a satellite operating institution, agency or the like, for example.

The imaging support apparatus 100 may be a computer such as a PC (personal computer), a tablet computer, a smartphone, a workstation, a server computer or a general purpose computer, or may be a computer system to which a plurality of computers are connected. Such a computer system is also a computer in a broad sense. Also, the imaging support apparatus 100 may be implemented by one or more virtual computer environment which is executable within the computer. Alternatively, the imaging support apparatus 100 may be a special purpose computer designed for supporting the image capturing, or may be a special purpose hardware achieved by a dedicated circuitry. Also, the imaging support apparatus 100 may achieve cloud computing when it can be connected to the Internet.

The imaging support apparatus 100 is configured to determine a timing at which the satellite image should be captured based on the prediction result of the imaging environment and to output it. In this way, the imaging support apparatus 100 supports capturing of the satellite image. The imaging support apparatus 100 includes a first information acquiring unit 110, a prediction result acquiring unit 120, a calculating unit 130, a determining unit 140 and a second information output unit 150.

The first information acquiring unit 110 is configured to acquire first information indicating a first timing at which a satellite image of a target area is captured. Herein, the target area is area of interest (AOI) to which the user desires to perform remote sensing. Suppose that the satellite image of such target area is captured at any time point (referred to as "a first timing") by the satellite 10. In such a case, the first information acquiring unit 110 may acquire information indicating the first timing as the first information. Note that the capturing does not necessarily have to be completed at the time point at which the first information acquiring unit 110 acquires the first information. That is, at the time point at which the first information acquiring unit 110 acquires the first information, there is no problem as long as the target area is determined to be captured at the first timing (for example, as long as the capturing is requested to the ground station 20), and it may be construed to be regardless of whether the satellite 10 actually completed the capturing of the target area. The first information acquiring unit 110 is configured to supply the acquired first information to the prediction result acquiring unit 120.

The prediction result acquiring unit 120 is configured to acquire a prediction result of a time-series prediction of an imaging environment in the target area. For example, the prediction result acquiring unit 120 may acquire the prediction result of the time-series prediction of the imaging environment in the target area with the first timing indicating the first information acquired by the first information acquiring unit 110 as a starting point. Such an imaging environment may include at least an index indicating the soil moisture content in the target area. In this regard, details are described below. Note that, "time-series" means series in a different plurality of time points (at least two time points), and it may be construed, not limited to a case in which an interval between the time point and the time point is constant, but to include a case in which the interval is not constant (a so-called point process). The prediction result acquiring unit 120 is configured to supply the acquired prediction result to the calculating unit 130.

The calculating unit 130 is configured to calculate on a time-series basis, based on the prediction result, a degree of similarity of the imaging environment between the first timing and each timing other than the first timing. For example, the calculating unit 130 may calculate, on a time-series basis, based on the prediction result acquired by the prediction result acquiring unit 120, a degree of similarity of the imaging environment between the first timing indicating the first information acquired by the first information acquiring unit 110 and each timing other than the first timing. The calculating unit 130 is configured to supply the calculated degree of similarity to the determining unit 140.

The determining unit 140 is configured to determine, based on the degree of similarity, a second timing at which the satellite image of the target area should be captured. For example, the determining unit 140 may determine, based on the degree of similarity calculated by the calculating unit 130, the second timing at which the satellite image of the target area should be captured. The determining unit 140 is configured to inform the determined second timing to the second information output unit 150.

The second information output unit 150 is configured to output second information indicating the second timing. For example, the second information output unit 150 may output second information indicating the second timing determined by the determining unit 140.

The operation of such an imaging support apparatus 100 will be described in detail. In the following, a case in which the imaging support apparatus 100 is applied to visible/reflected infrared remote sensing among the remote sensings will be described as an example. Accordingly, the satellite image which is captured with the support of the imaging support apparatus 100 may be a multispectral image. Such multispectral image is configured to record electromagnetic wave of different spectrums reflected by various objects configuring a land surface (water, soil, plant and the like). However, the present invention is not limited to this. The imaging support apparatus 100 can be applied to another remote sensing such as thermal infrared remote sensing or microwave remote sensing.

Figure 2:
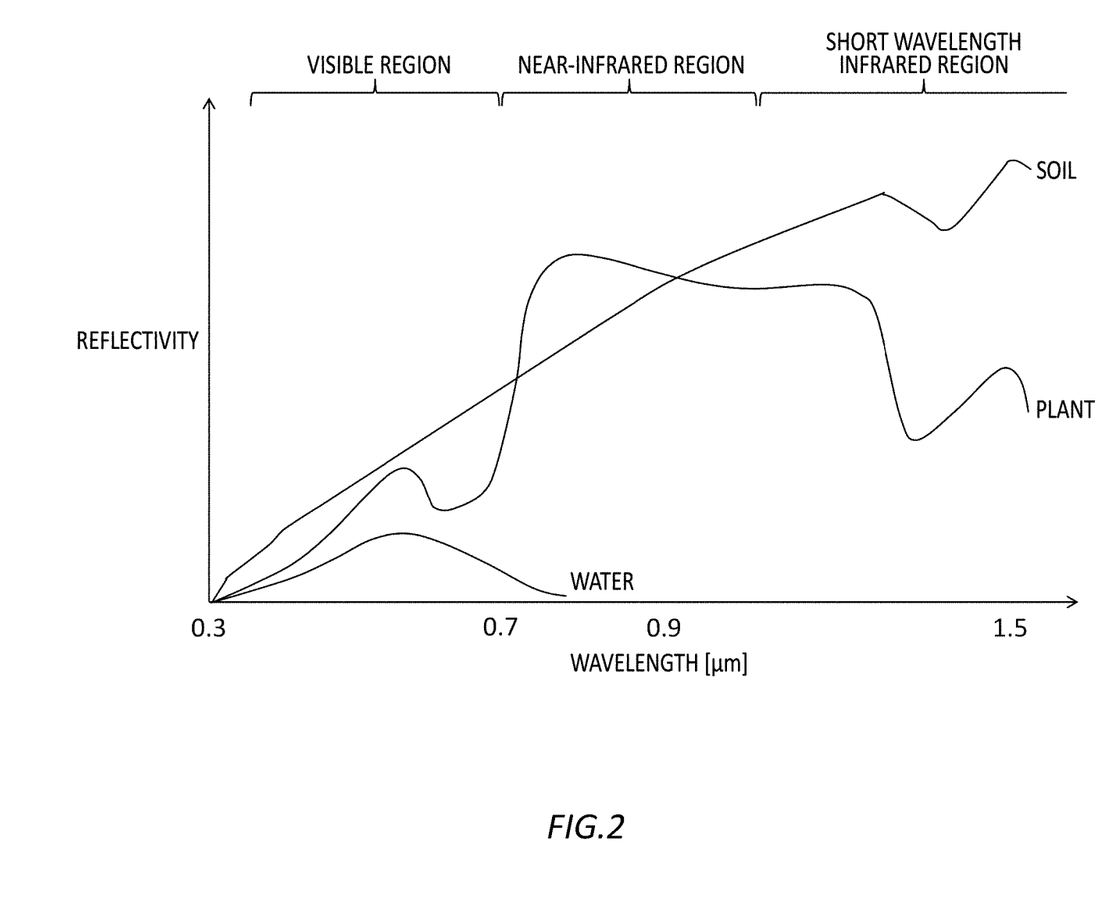
FIG. 2 shows an example of spectral reflection characteristics of water, soil and plant.

FIG. 2 shows an example of spectral reflection characteristics of water, soil and plant. In the present drawing, the horizontal axis indicates a wavelength of electromagnetic wave with a unit of μm. Also, in the present drawing, the vertical axis indicates the reflectivity. As shown in the present drawing, spectral reflection characteristic indicates characteristic of the reflectivity for each of the spectrums in each object. The object configuring the land surface has different reflectivity characteristics for each of the spectrums depending on their types. For example, "water" has a visible region (0.4~ 0.7 μm) as a main reflection area. "Soil" tends to reflect more strongly as the wavelength becomes longer, and has the short wavelength infrared region (1.3~3 μm) as a main reflection area. "Plant" has the characteristic of efficiently absorbing visible region and reflecting near-infrared region (0.7~1.3 μm) through the action of photosynthesis pigments.

A multispectral image for recording electromagnetic waves of different wavelength bands may be important data for understanding the spectrum reflecting characteristics of such objects. By performing an operation by using the information of the different wavelength bands included in the multispectral image, a feature of the object of the land surface can be successfully captured. Such an operation is referred to as an interband operation. As an example, in a vegetation monitoring by a remote sensing, an indicator called Normalized Difference Vegetation Index (NDVI) using spectral reflection characteristics of a plant is widely used.

NDVI is calculated by the expression "NDVI=(NIR−RED)/(NIR+RED)". Herein, NIR is the reflectivity of the near-infrared region and RED indicates the reflectivity of the red visible region. That is, NDVI is obtained by dividing the difference between the reflectivities of the near-infrared band and the red band both reflected by the plant with the sum thereof. NDVI is indicated by numerical values normalized from values of −1 to 1, the value increases as the vegetation becomes denser. Attempts are made to capture changes in vegetation by using such NDVI as an indicator indicating the amount or activity height of the vegetation.

However, such an indicator can include various errors due to the imaging environment of the satellite image. As an example, when capturing an image from the satellite 10 to plants on the land surface, there may exist a portion in which the soil can be seen from a gap among the plants. However, the state of the soil (for example, moisture content) may change from moment to moment. Such change may also affect the reflectivity of the near-infrared region or visible region, and of course may also appear as an error on NDVI calculated based thereon. Accordingly, in capturing changes of the land surface, it is important to reduce the influence of such a difference in imaging environment on the analysis results. The imaging support apparatus 100 according to the present embodiment supports capturing the satellite images so as to reduce such influences, for example.

Figure 3:
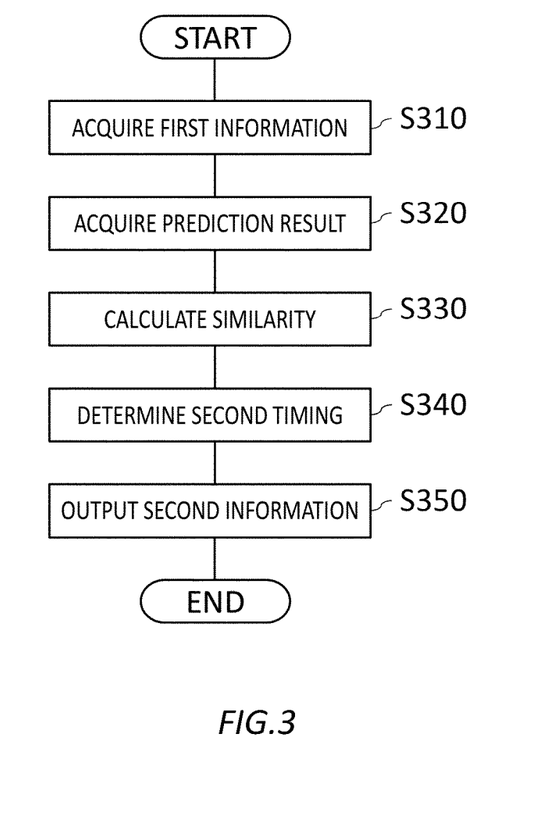
FIG. 3 indicates an example of an imaging support method flow that may be performed by the imaging support apparatus 100 according to the present embodiment.

FIG. 3 indicates an example of an imaging support method flow that may be performed by the imaging support apparatus 100 according to the present embodiment. The imaging support apparatus 100 may support capturing of the satellite image by outputting second information according to this flow, for example.

In step S310, the imaging support apparatus 100 acquires first information. For example, the first information acquiring unit 110 may acquire first information indicating a first timing at which a satellite image of a target area is captured. As an example, suppose that the user specified the target area with various kinds of information such as an address, a name of the place, an object, a zip code, or the user specified the target area with a geographical coordinate (for example, latitude, longitude) given by performing geocoding on the various kinds of information. Then, suppose that the user requested to the ground station 20 for capturing, on any time point (for example, 9:00 on Oct. 1, 2022) a satellite image of the target area specified in such a way. In such a case, the first information acquiring unit 110 may acquire information indicating the first timing (=9:00 on Oct. 1, 2022) as the first information. At this time, the first information acquiring unit 110 may acquire such first information via user input, or may acquire such first information from an imaging request command to the ground station 20. Also, when data (referred to as a first satellite image data) of the satellite image (referred to as a first satellite image) captured based on such an imaging request is saved in the database 40, the first information acquiring unit 110 may acquire the first information from metadata saved in the database 40 in association with the first satellite image data. The first information acquiring unit 110 is configured to supply the acquired first information, together with information specifying the target area, to the prediction result acquiring unit 120.

In step S320, the imaging support apparatus 100 acquires a prediction result. For example, the prediction result acquiring unit 120 may acquire a prediction result of a time-series prediction of an imaging environment in the target area. As an example, the prediction result acquiring unit 120 may acquire a prediction result obtained by predicting on a time-series basis, an imaging environment in the target area across a predetermined target period (for example, one month. That is, 9:00 on Oct. 1, 2022~9:00 on Nov. 1, 2022 herein) with the first timing indicating the first information acquired in step S310 as a starting point. At this time, the prediction result acquiring unit 120 may access homepages of the Meteorological Agency, Private Weather Service Support Center, Weather Service provider and the like (referred to as the Meteorological Agency and the like) as it acquires such prediction result. Then, the prediction result acquiring unit 120 may retrieve database of the Meteorological Agency and the like with a type of the target area, the target period and the weather data as a retrieve key. Then, the prediction result acquiring unit 120 may download the retrieved data as a CSV (Comma Separated Value) file, for example. The prediction result acquiring unit 120 may acquire the weather data obtained in such a way, for example, as a prediction result.

Herein, the prediction result may include one or more indicators that may indicate various imaging environments that affect the capturing of the satellite image. Such indicator includes, for example, weather, cloud, temperature, humidity, precipitation amount, sunshine hour, wind speed, wind direction and the like. Also, as described above, when monitoring the vegetation, the soil moisture content may appear on NDVI as an error. Accordingly, it is desirable that the prediction result includes an index indicating the soil moisture content, for example, a soil water index. The prediction result acquiring unit 120 may acquire such prediction result, for example, from the Meteorological Agency and the like. The prediction result acquiring unit 120 is configured to supply the acquired prediction result to the calculating unit 130.

In step S330, the imaging support apparatus 100 calculates a degree of similarity. For example, the calculating unit 130 may calculate, on a time-series basis, based on the prediction result acquired in step S320, a degree of similarity of the imaging environment between the first timing indicating the first information acquired in step S310 and each timing other than the first timing. As an example, if the prediction result acquired in step S320 includes a plurality of indicators, the prediction result is multi-dimensional data indicating a value for each indicator. In this case, the calculating unit 130 may calculate, on a time-series basis, a distance between the data for each indicator with respect to the first timing. Such distance between the data indicates that the lower the value is, the more similar the imaging environment is to the first timing.

Then, the calculating unit 130 may perform weighted addition on the distance calculated for each indicator. At this time, the calculating unit 130 may set a weight for each indicator in response to a degree of influence on capturing the satellite image. Also, the calculating unit 130 may provide a constraint condition on an indicator which is considered to be important. For example, if a soil moisture content is considered to be important, the calculating unit 130 may set a weight function for a soil water index such that a weighted mean becomes a value which is large enough when a distance for the soil water index is equal to or greater than a predetermined threshold In this way, the calculating unit 130 can exclude a timing whose soil moisture content is not similar to the first timing not to be selected as a potential timing. The calculating unit 130 is configured to supply the weighted mean calculated in such a way, for example, to the determining unit 140 as the degree of similarity.

In step S340, the imaging support apparatus 100 determines a second timing. For example, the determining unit 140 may determine, based on the degree of similarity calculated in step S330, the second timing at which a second satellite image should be captured. As an example, the determining unit 140 may select a timing at which the weighted mean calculated in step S330 becomes less than a predetermined threshold as a potential timing. Then, the determining unit 140 may determine the second timing from among the potential timings with consideration about other various conditions (for example, a trajectory condition or maintenance condition and the like of the satellite 10).

Herein, if the soil moisture content is provided as the constraint condition as described above, a potential timing at which the weighted mean becomes less than the predetermined threshold can be a timing at which the difference in the indexes indicating the soil moisture content satisfies a predetermined criterion between the first timing and each timing other than the first timing. Accordingly, the determining unit 140 determines, between the first timing and each timing other than the first timing, the second timing from among the potential timings at which the difference in the indexes indicating the soil moisture content satisfies a predetermined criterion.

Note that such second timing preferably includes a plurality of time points (may be a continuous time period or may be a group of multiple discrete time points), not only one time point. In this way, a situation in which the satellite 10 cannot capture images at the determined second timing due to some reasons can be avoided, and the determining unit 140 informs the second information output unit 150 the determined second timing.

In step S350, the imaging support apparatus 100 outputs second information. For example, the second information output unit 150 may output second information indicating the second timing determined in step S340. At this time, as an example, the second information output unit 150 may output and display the second information on a monitor, may output the second information audibly through a speaker, may print out the second information through a printer, may output and transmit the second information to another apparatus.

In this way, a user who perceived the second information can newly request the ground station 20 for capturing at the second timing the target area. That is, the user can specify the timing at which the second satellite image is captured as a timing whose imaging environment is similar to the timing at which the first satellite image is captured.

During the remote sensing, attempts are made to capture changes in a land surface by analyzing a plurality of satellite images captured at different time points. However, upon capturing the satellite images, the imaging environment changes from moment to moment. Therefore, a difference in the imaging environment between the plurality of satellite images may affect the analysis results. Therefore, the capture of the satellite image considering the imaging environment is studied. However, conventionally, only the scheduling was made not to perform image capturing when the imaging environment is bad (for example, when it rains or when there are many clouds), and it was not possible to positively make the imaging environment similar at a plurality of timings for capturing the satellite image.

Meanwhile the imaging support apparatus 100 according to the present embodiment is configured to determine a timing at which the satellite image should be captured based on the prediction result of the imaging environment and to output it. In this way, according to the imaging support apparatus 100 according to the present embodiment, as it is possible to make widely known the timing at which the imaging environment is made similar to the timing at which the first satellite image is captured, for example, the user can positively make the imaging environment similar at a plurality of timings at which the satellite image is captured. Therefore, for example, if the plurality of satellite image data is analyzed to capture the change of the land surface, it is possible to reduce the possibility of false detection such as detecting the change on the image even though there is no actual change, or not detecting the change on the image even though there is actual change.

In addition, the imaging support apparatus 100 according to the present embodiment also considers an indicator indicating the soil moisture content in the target area as the imaging environment. In this way, it is possible to reduce the influence of the soil state change on the analysis result. This is particularly effective when an interband operation is used which uses a near-infrared region or a visible region for the image analysis, for example, when monitoring the vegetation by using NDVI and the like.

Figure 4:
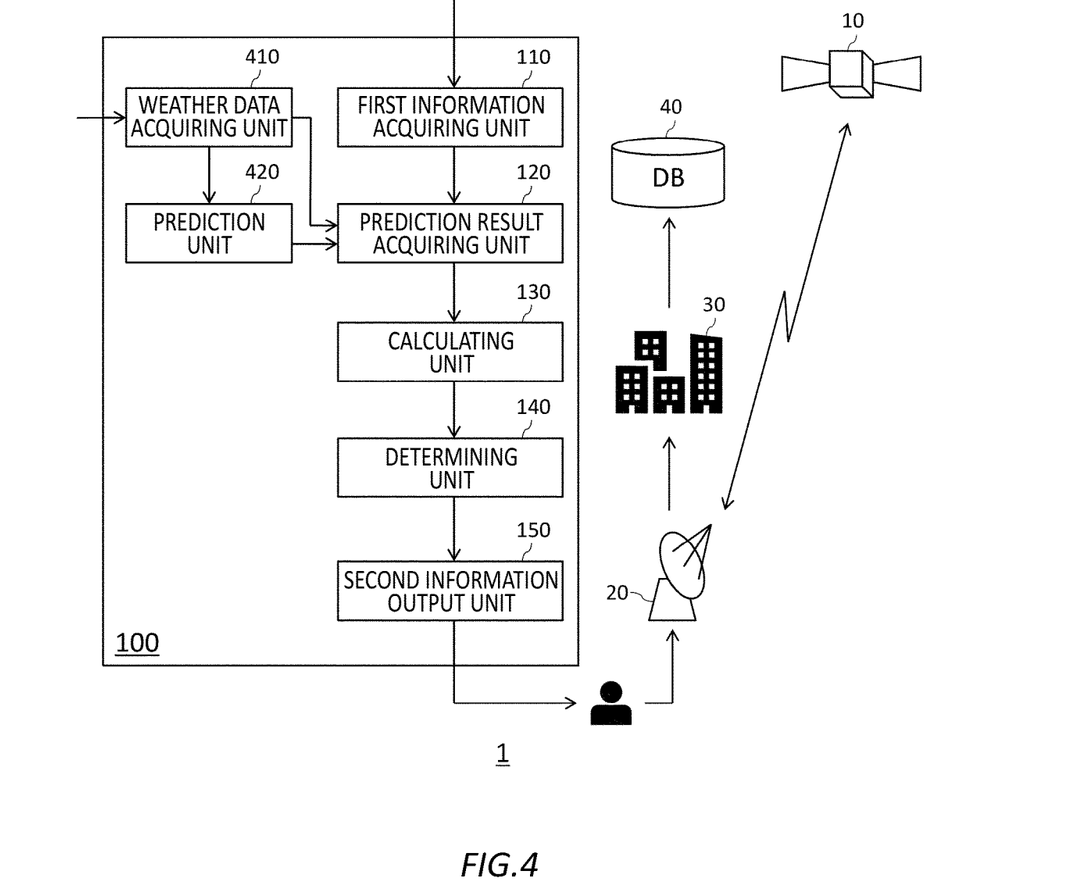
FIG. 4 shows an example of a block diagram of an imaging system 1 that may include the imaging support apparatus 100 according to a variation of the present embodiment.

FIG. 4 shows an example of a block diagram of an imaging system 1 that may include the imaging support apparatus 100 according to a variation of the present embodiment. In FIG. 4, members having the same functions and configurations as those in FIG. 1 are denoted by the same reference numerals, and description thereof will be omitted except for differences. In the embodiment described above, the case in which the imaging support apparatus 100 acquires the expected result from the outside such as the Meteorological Agency has been described as an example. However, in the modified example, the imaging support apparatus 100 predicts at least a part of the prediction result on its own. The imaging support apparatus 100 according to the modified example further includes a weather data acquiring unit 410 and a prediction unit 420 in addition to the functional units the imaging support apparatus 100 according to the embodiment described above includes. Then, in the modified example, the prediction result acquiring unit 120 is configured to acquire at least a part of the prediction result from the prediction unit 420. In the following, the case in which the imaging support apparatus 100 predicts an index indicating the soil moisture content is described as an example. However, the present invention is not limited to this. The imaging support apparatus 100 may predict other various indicators.

The weather data acquiring unit 410 is configured to acquire weather data. The way of acquiring the weather data may be as described above. The Meteorological Agency and the like combines the advantages of AMeDAS (Automated Meteorological Data Acquisition System) which is located in approximately 1,300 locations (with approximately 17 km intervals) nationwide and weather radars configured to observe the distribution of rainfall across the country to calculate the accurate rainfall amount for each 5 km grid nationwide and publish it. The weather data acquiring unit 410 may acquire, as weather data, at least an amount of precipitation analyzed by radar-AMeDAS published from the Meteorological Agency and the like in such a way, for example. The weather data acquiring unit 410 is configured to supply the acquired weather data to the prediction unit 420. Note that the weather data acquiring unit 410 may supply the weather data which can be used as it is as a prediction result of the imaging environment among the acquired weather data to the prediction result acquiring unit 120 rather than the prediction unit 420.

The prediction unit 420 is configured to predict the imaging environment (the index indicating the soil moisture content herein) based on the weather data. And the prediction unit 420 is configured to supply the prediction result to the prediction result acquiring unit 120. At this time, the prediction unit 420 may predict an index indicating the soil moisture content by using a tank model. The details are described in this regard.

Figure 5:
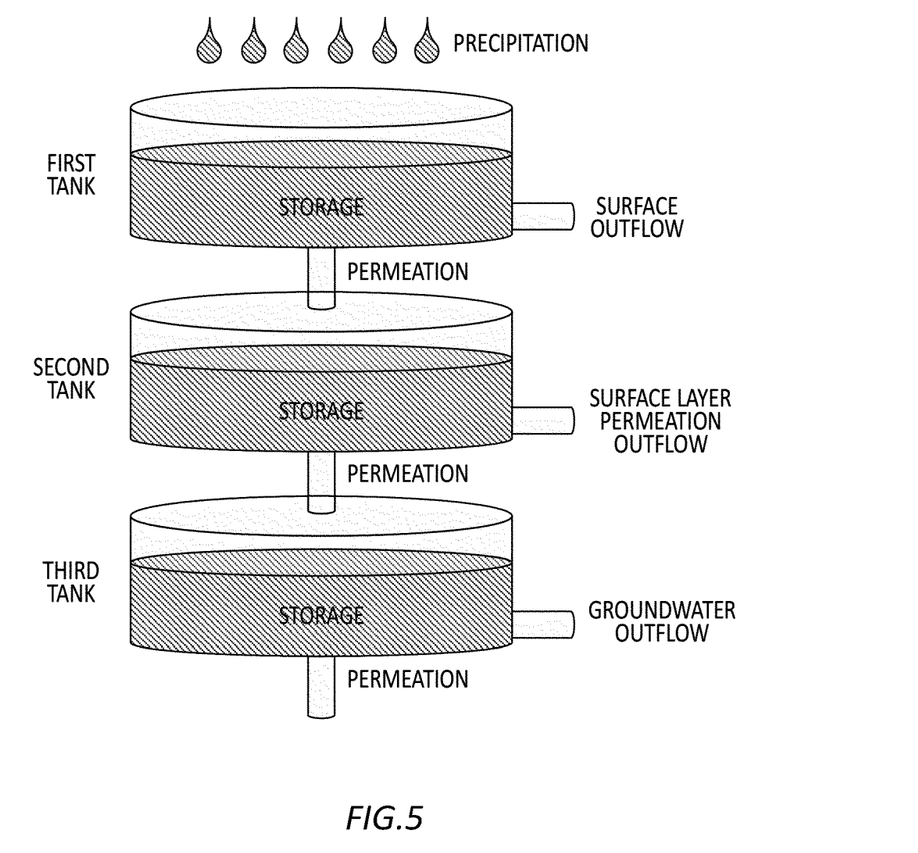
FIG. 5 shows an example of a tank model.

FIG. 5 shows an example of a tank model. The tank model is a model in which three perforated tanks arranged in series to represent a situation in which rain that has fallen on the ground soaks into the soil and then flows into a river and the like with a time delay. Each tank has an outflow hole on the side surface that represents the water flowing out to the surroundings and has a permeation hole on the bottom surface that represents the water impregnates deeper. The outflow hole of the first tank corresponds to a surface outflow, the outflow hole of the second tank corresponds to a surface layer permeation outflow, and the outflow hole of the third tank corresponds to a groundwater outflow, respectively. Also, the inflow into the first tank corresponds to the precipitation, the inflow into the second tank corresponds to the outflow from the permeation hole of the first tank, and the inflow into the third tank corresponds to the outflow from the permeation hole of the second tank, respectively. That is, in the tank model, the moisture content included in the soil is estimated by a value obtained by subtracting "the amount of water outflowed into the river and the like" and "the amount of water permeated into the soil below" from "the amount of rain that has fallen so far". Then, in the tank model, the soil water index is calculated by the total amount of moisture content remaining in each tank (storage amount) and it corresponds to the index indicating the soil moisture content.

In such a tank model, there is a plurality of parameters to be set, such as the height of the outflow hole, the outflow coefficient, and the permeation coefficient. The soil water index published by the Meteorological Agency and the like uses a uniform parameter nationwide as those parameters, and generally does not consider vegetation, geology, weathering and the like in individual regions.

Therefore, the imaging support apparatus 100 according to the modified example is configured to predict such an index on its own, instead of acquiring from outside such as the Meteorological Agency. As an example, the weather data acquiring unit 410 is configured to acquire an amount of precipitation analyzed by radar-AMeDAS, and the prediction unit 420 may calculate the soil water index by using the amount of precipitation analyzed by radar-AMeDAS and the tank model. Then, the prediction result acquiring unit 120 may acquire the soil water index calculated by the prediction unit 420 as at least a part of the prediction result.

In such a way, the imaging support apparatus 100 according to the modified example may predict the imaging environment (the index indicating the soil moisture content herein) on its own. In this way, according to the imaging support apparatus 100 according to the modified example, as the parameter can be tuned considering the vegetation, geology, weathering and the like in the target area, the imaging environment can be predicted with relatively high accuracy by using a model optimized for the target area.

Figure 6:
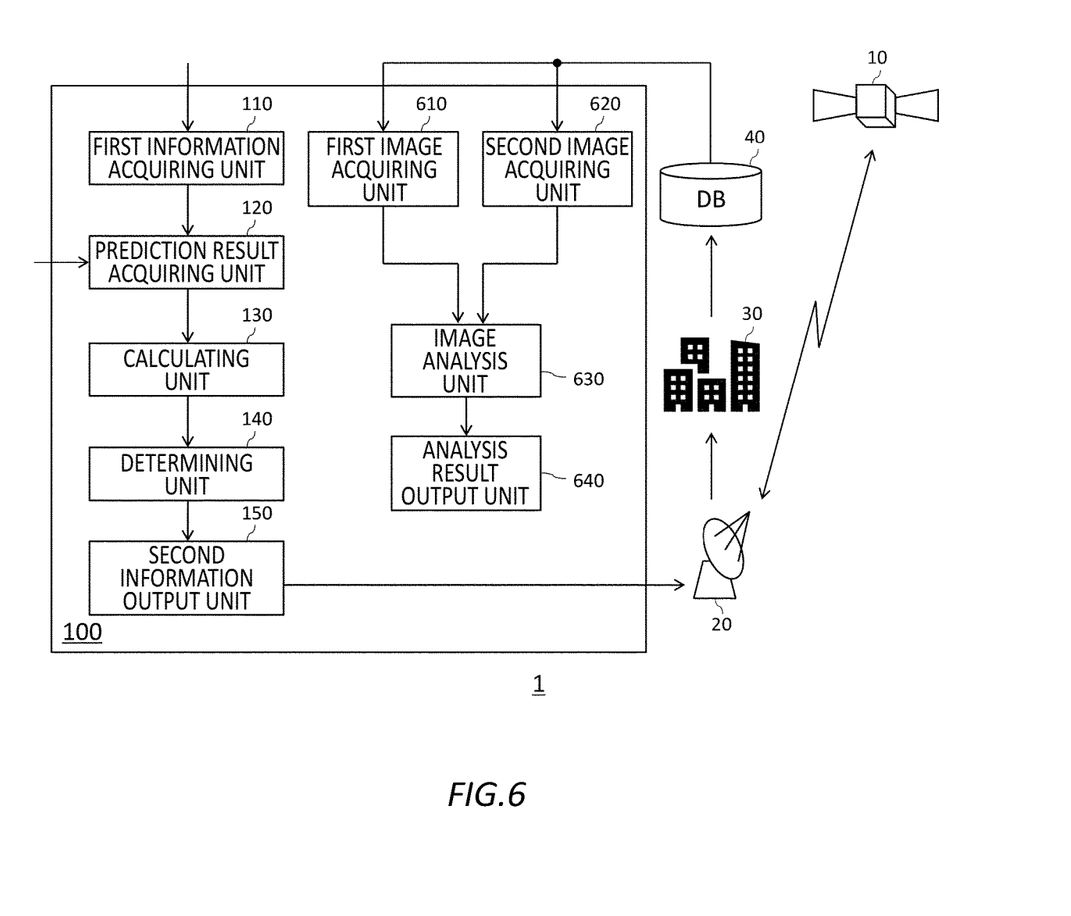
FIG. 6 shows an example of a block diagram of an imaging system 1 that may include the imaging support apparatus 100 according to another variation of the present embodiment.

FIG. 6 shows an example of a block diagram of an imaging system 1 that may include the imaging support apparatus 100 according to another variation of the present embodiment. In FIG. 6, members having the same functions and configurations as those in FIG. 1 are denoted by the same reference numerals, and description thereof will be omitted except for differences. In the embodiment described above, the case in which the imaging support apparatus 100 has only a function to support the capturing of the satellite image is described as an example. However, in the modified example, the imaging support apparatus 100 further includes a function to analyze acquiring the satellite image data in addition to the function to support the capturing of the satellite image. The imaging support apparatus 100 according to the modified example further includes a first image acquiring unit 610, a second image acquiring unit 620, an image analysis unit 630 and an analysis result output unit 640, in addition to the functional units the imaging support apparatus 100 according to the embodiment described above includes. Also, in the modified example, the second information output unit 150 can also output and transmit, to the ground station 20, an imaging request command configured to request capturing the target area at the second timing.

The first image acquiring unit 610 is configured to acquire the first satellite image data obtained by capturing the target area at the first timing. For example, the first image acquiring unit 610 may acquire the first satellite image data obtained by capturing the target area at the first timing from the database 40 via a network. However, the present invention is not limited to this. The first image acquiring unit 610 may acquire the first satellite image data via various memory devices or user input, or may acquire the first satellite image data from another apparatus different from the database 40. The first image acquiring unit 610 is configured to supply the acquired first satellite image data to the image analysis unit 630.

The second image acquiring unit 620 is configured to acquire the second satellite image data obtained by capturing the target area at the second timing. For example, the second image acquiring unit 620 may acquire the second satellite image data obtained by capturing the target area at the second timing from the database 40 via a network. However, the present invention is not limited to this. The second image acquiring unit 620 may acquire the second satellite image data via various memory devices or user input, or may acquire the second satellite image data from another apparatus different from the database 40. Note that such second satellite image data may be acquired in response to the imaging request command output to be transmitted to the ground station 20 by the second information output unit 150. The second image acquiring unit 620 is configured to supply the acquired second satellite image data to the image analysis unit 630.

The image analysis unit 630 is configured to analyze the first satellite image data and the second satellite image data. For example, the image analysis unit 630 may analyze the first satellite image data acquired by the first image acquiring unit 610 to generate an NDVI image at the first timing. Also, the image analysis unit 630 may analyze the second satellite image data acquired by the second image acquiring unit 620 to generate an NDVI image at the second timing. Then, the image analysis unit 630 may detect the change of vegetation in the target area based on the difference between the NDVI image at the first timing and the NDVI image at the second timing. The image analysis unit 630 can detect the change of vegetation in the target area based on the difference between the first satellite image data and the second satellite image data in such a way, for example.

Note that, in the description described above, the case in which the vegetation is monitored by using NDVI is shown as an example, but it is not limited thereto. Instead of or in addition to NDVI, another indicator such as Extended Vegetation Index (EVI) or Leaf Area Index (LAI) may be used. The image analysis unit 630 is configured to supply the analysis result to the analysis result output unit 640.

The analysis result output unit 640 is configured to output the analysis result. For example, the analysis result output unit 640 may output the result obtained by analyzing by the image analysis unit 630. At this time, as an example, the analysis result output unit 640 may output and display the analysis result on a monitor, may output the analysis result audibly through a speaker, may print out the analysis result through a printer, may output and transmit the analysis result to another apparatus. Also, the analysis result output unit 640 may generate, when the change of vegetation detected in the analysis result exceeds a predetermined criterion, an alert to that effect.

In such a way, the imaging support apparatus 100 according to the modified example may further includes a function to acquire the first satellite image data and the second satellite image data, and a function to analyze those image data. In this way, according to the imaging support apparatus 100 according to the modified example can achieve, by one apparatus, a function to support the capturing of the satellite image, and a function to acquire and analyze the captured satellite image data.

Also, the imaging support apparatus 100 according to the modified example may detect the change of vegetation in the target area based on the difference between the first satellite image data and the second satellite image data. Herein, the first satellite image and the second satellite image are obtained by positively adjusting the capturing timings so that the imaging environments are similar. Accordingly, it has a high affinity with the technique of performing difference analysis on the plurality of satellite image data acquired in such a way. In this way, according to the imaging support apparatus 100 according to the modified example can obtain an analysis result with high accuracy which is obtained by reducing the influence due to the difference in the imaging environment, and can reduce the possibility of false detection.

Also, the imaging support apparatus 100 according to the modified example may generate an alert when the change of vegetation exceeding a predetermined criterion is detected. In this way, according to the imaging support apparatus 100 according to the modified example, a change in the vegetation due to climate change, or artificial deforestation or the like can be widely known using the result analyzed with high accuracy as the ground.

Also, the imaging support apparatus 100 according to the modified example may output and transmit, to the ground station 20, an imaging request command configured to request capturing the target area at the second timing. In this way, according to the imaging support apparatus 100 according to the modified example, the acquisition of the second satellite image can be automated without a new imaging request by the user who perceived the second information. Also, the imaging support apparatus 100 according to the modified example may determine the next second timing transmit and output further imaging request command to the ground station by acquiring the second timing at which the second satellite image is captured as a new first timing. In this way, according to the imaging support apparatus 100 according to the modified example, a continuous acquisition of the satellite image can be automated.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuit supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. The programmable circuit may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer-readable medium may include any tangible device that can store instructions to be executed by a suitable device, and as a result, the computer-readable medium having instructions stored thereon includes an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, special purpose computer, or other programmable data processing apparatuses, or to a programmable circuit, locally or via a local area network (LAN), wide area network (WAN) such as the Internet, or the like, to execute the computer-readable instructions to create means for performing operations specified in the flowcharts or block diagrams. An example of the processor includes a computer processor, processing unit, microprocessor, digital signal processor, controller, microcontroller, etc.

Figure 7:
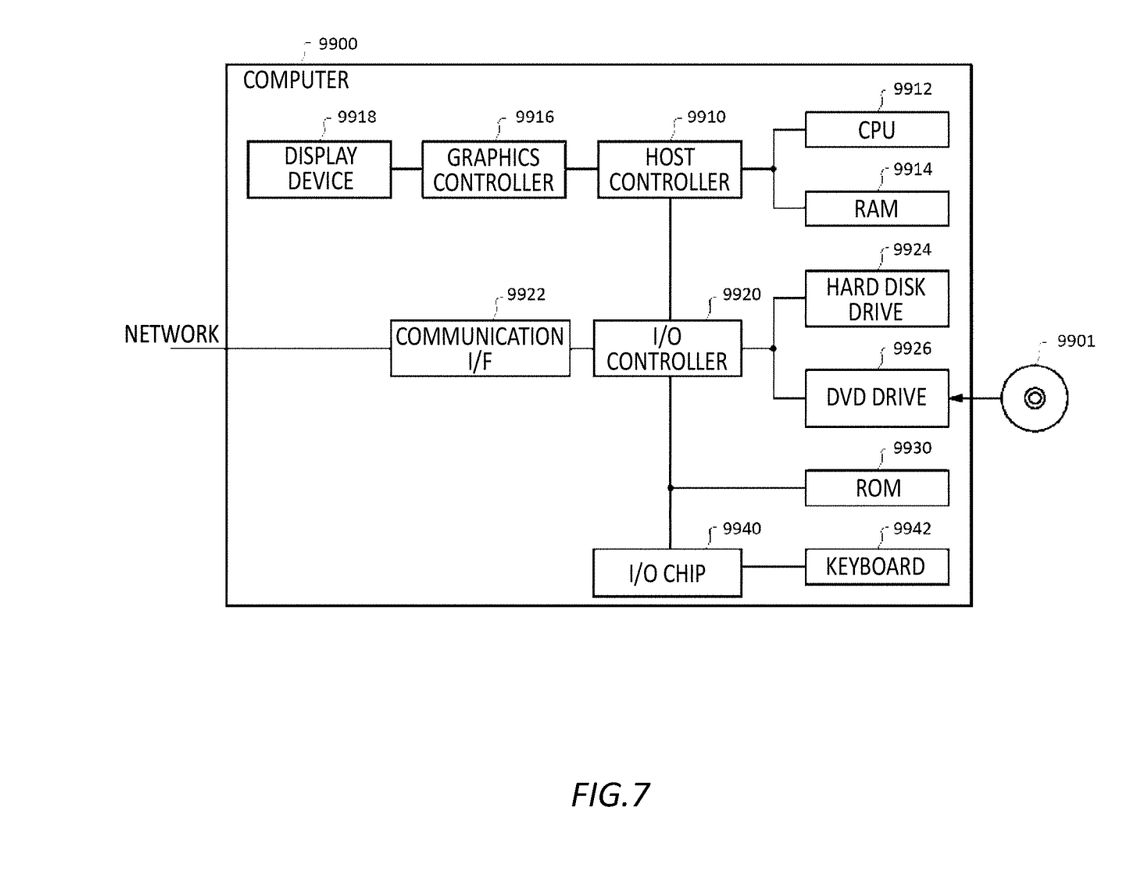
FIG. 7 shows an example of a computer 9900 in which a plurality of aspects of the present invention may be entirely or partially embodied.

FIG. 7 shows an example of a computer 9900 where a plurality of aspects of the present invention may be entirely or partially embodied. A program that is installed in the computer 9900 can cause the computer 9900 to function as or execute operations associated with the apparatus of the embodiment of the present invention or one or more sections of the apparatus, and/or cause the computer 9900 to execute the processes of the embodiment of the present invention or steps thereof. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads the programs and the data from the IC card, and/or writes the programs and the data to the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer-readable medium such as the DVD-ROM 9901 or the IC card. The program is read from the computer-readable medium, installed into the hard disk drive 9924, the RAM 9914, or the ROM 9930, which are also examples of a computer-readable medium, and executed by the CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

Also the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. Also the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer-readable medium on or near the computer 9900. Also a recording medium such as a hard disk or a RAM provided in a server system connected to a dedicated communication network or the Internet can be used as the computer-readable medium, thereby providing the program to the computer 9900 via the network.

While the embodiment of the present invention has been described, the technical scope of the invention is not limited to the above-described embodiment. It is apparent to persons skilled in the art that various alterations and improvements can be added to the above-described embodiment. It is also apparent from the description of the claims that the embodiment to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES 1 remote sensing system
10 satellite
20 ground station
30 processing station
40 database
100 imaging support apparatus
110 first information acquiring unit
120 prediction result acquiring unit
130 calculating unit
140 determining unit
150 second information output unit
410 weather data acquiring unit
420 prediction unit
610 first image acquiring unit
620 second image acquiring unit
630 image analysis unit
640 analysis result output unit
9900 computer
9901 DVD-ROM
9910 host controller
9912 CPU
9914 RAM
9916 graphics controller
9918 display device
9920 input/output controller
9922 communication interface
9924 hard disk drive
9926 DVD drive
9930 ROM
9940 input/output chip
9942 keyboard.

What is claimed is:

1. An imaging support apparatus comprising:
a first information acquiring unit configured to acquire first information indicating a first timing at which a satellite image of a target area is captured;
a prediction result acquiring unit configured to acquire a prediction result of a time-series prediction of an imaging environment in the target area;
a calculating unit configured to calculate on a time-series basis, based on the prediction result, a degree of similarity of an imaging environment between the first timing and each timing other than the first timing;
a determining unit configured to determine a second timing on which a satellite image of the target area is to be captured based on the degree of similarity; and
a second information output unit configured to output second information indicating the second timing.

2. The imaging support apparatus according to claim 1, wherein the imaging environment includes at least an index indicating a soil moisture content in the target area.

3. The imaging support apparatus according to claim 2, further comprising:
a weather data acquiring unit configured to acquire weather data; and
a prediction unit configured to predict the index based on the weather data.

4. The imaging support apparatus according to claim 3, wherein the prediction unit is configured to predict the index by using a tank model.

5. The imaging support apparatus according to claim 2, wherein the determining unit is configured to determine the second timing from among potential timings at which a difference in the index satisfies a predetermined criterion between the first timing and each timing other than the first timing.

6. The imaging support apparatus according to claim 3, wherein the determining unit is configured to determine the second timing from among potential timings at which a difference in the index satisfies a predetermined criterion between the first timing and each timing other than the first timing.

7. The imaging support apparatus according to claim 4, wherein the determining unit is configured to determine the second timing from among potential timings at which a difference in the index satisfies a predetermined criterion between the first timing and each timing other than the first timing.

8. The imaging support apparatus according to claim 1, wherein the second information output unit is configured to output an imaging request command configured to request for capturing the target area at the second timing.

9. The imaging support apparatus according to claim 2, wherein the second information output unit is configured to output an imaging request command configured to request for capturing the target area at the second timing.

10. The imaging support apparatus according to claim 3, wherein the second information output unit is configured to output an imaging request command configured to request for capturing the target area at the second timing.

11. The imaging support apparatus according to claim 4, wherein the second information output unit is configured to output an imaging request command configured to request for capturing the target area at the second timing.

12. The imaging support apparatus according to claim 1, further comprising:
a first image acquiring unit configured to acquire first satellite image data obtained by capturing the target area at the first timing; and
a second image acquiring unit configured to acquire second satellite image data obtained by capturing the target area at the second timing.

13. The imaging support apparatus according to claim 2, further comprising:
a first image acquiring unit configured to acquire first satellite image data obtained by capturing the target area at the first timing; and
a second image acquiring unit configured to acquire second satellite image data obtained by capturing the target area at the second timing.

14. The imaging support apparatus according to claim 3, further comprising:
a first image acquiring unit configured to acquire first satellite image data obtained by capturing the target area at the first timing; and
a second image acquiring unit configured to acquire second satellite image data obtained by capturing the target area at the second timing.

15. The imaging support apparatus according to claim 4, further comprising:
a first image acquiring unit configured to acquire first satellite image data obtained by capturing the target area at the first timing; and
a second image acquiring unit configured to acquire second satellite image data obtained by capturing the target area at the second timing.

16. The imaging support apparatus according to claim 12, further comprising an image analysis unit configured to analyze the first satellite image data and the second satellite image data.

17. The imaging support apparatus according to claim 16, wherein the image analysis unit is configured to detect a change in vegetation in the target area based on a difference between the first satellite image data and the second satellite image data.

18. The imaging support apparatus according to claim 17, further comprising an analysis result output unit configured to generate an alert when the change in vegetation exceeds a predetermined criterion.

19. An imaging support method, wherein the imaging support method is performed by a computer and comprises steps executed by the computer, the steps including:
acquiring first information indicating a first timing at which a satellite image of a target area is captured;
acquiring a prediction result of a time-series prediction of an imaging environment in the target area;
calculating on a time-series basis, based on the prediction result, a degree of similarity of an imaging environment between the first timing and each timing other than the first timing;
determining a second timing on which a satellite image of the target area is to be captured based on the degree of similarity; and
outputting second information indicating the second timing.

20. A non-transitory computer-readable medium having an imaging support program recorded thereon, wherein the imaging support program is performed by a computer, and causes the computer to function as: a first information acquiring unit configured to acquire first information indicating a first timing at which a satellite image of a target area is captured;
a prediction result acquiring unit configured to acquire a prediction result of a time-series prediction of an imaging environment in the target area;
a calculating unit configured to calculate on a time-series basis, based on the prediction result, a degree of similarity of an imaging environment between the first timing and each timing other than the first timing;
a determining unit configured to determine a second timing on which a satellite image of the target area is to be captured based on the degree of similarity; and
a second information output unit configured to output second information indicating the second timing.

* * * * *